United States Patent
Yoshimura et al.

(10) Patent No.: US 9,681,079 B2
(45) Date of Patent: Jun. 13, 2017

(54) SOLID-STATE IMAGE PICKUP APPARATUS WITH VERTICAL TRANSFER UNIT AND HORIZONTAL TRANSFER UNIT; AND CAMERA SYSTEM

(71) Applicant: Sony Semiconductor Solutions Corporation, Kanagawa (JP)

(72) Inventors: Norihiko Yoshimura, Fukuoka (JP); Hiroaki Tanaka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 379 days.

(21) Appl. No.: 13/763,205

(22) Filed: Feb. 8, 2013

(65) Prior Publication Data

US 2013/0229558 A1  Sep. 5, 2013

(30) Foreign Application Priority Data

Mar. 5, 2012  (JP) .................................. 2012-048215

(51) Int. Cl.
*H04N 5/372* (2011.01)

(52) U.S. Cl.
CPC ......... *H04N 5/37213* (2013.01); *H04N 5/372* (2013.01)

(58) Field of Classification Search
CPC . H01L 27/148; H01L 27/14806; H04N 3/155; H04N 3/1576; H04N 5/372
USPC ....... 348/272, 281, 282, 283, 294, 302, 303, 348/304, 311, 312, 313, 314, 315, 316, 348/317, 318, 319, 320, 321, 322, 323, 348/324
See application file for complete search history.

(56) References Cited

U.S. PATENT DOCUMENTS

| | | | | |
|---|---|---|---|---|
| 4,884,134 A | * | 11/1989 | Tsuji ..................... | A61B 1/05 348/230.1 |
| 5,777,671 A | * | 7/1998 | Maki ..................... | H04N 5/361 348/303 |
| 2007/0103573 A1 | * | 5/2007 | Sakamoto ............ | H04N 3/1537 348/294 |
| 2007/0263110 A1 | * | 11/2007 | Itsumi ................... | H04N 3/155 348/311 |

(Continued)

FOREIGN PATENT DOCUMENTS

| | | |
|---|---|---|
| JP | 2006-310655 | 11/2006 |
| JP | 2009-290890 | 12/2009 |

*Primary Examiner* — Justin P Misleh
(74) *Attorney, Agent, or Firm* — Michael Best & Friedrich LLP

(57) ABSTRACT

A solid-state image pickup apparatus includes a timing signal generation unit, a plurality of sensor units arranged in a matrix pattern and configured to perform photoelectric conversion of light received on an image pickup surface to accumulate signal charges, a vertical transfer unit provided for each vertical column of the sensor units and configured to transfer the signal charges in a plurality of divided fields in a vertical direction in an image pickup area in a plurality of horizontal blanking periods, a horizontal transfer unit configured to perform a horizontal transfer of the signal charges to the vertical transfer unit along with the horizontal blanking period, and a vertical and horizontal shift control unit configured to control a timing at which the vertical transfer unit transfers the signal charges to the horizontal transfer unit for each vertical column of the sensor units on the basis of the timing signal.

10 Claims, 10 Drawing Sheets

(56) References Cited

U.S. PATENT DOCUMENTS

2011/0075002 A1* 3/2011 Kato ................. H04N 5/361
                                                      348/311
2011/0292267 A1* 12/2011 Yonemura ......... H01L 27/14812
                                                        348/311

* cited by examiner

FIG.9

| (1) | (3) | (2) | (4) | (3) | (1) | (4) | (2) |
|---|---|---|---|---|---|---|---|
| ⋮ | ⋮ | ⋮ | ⋮ | ⋮ | ⋮ | ⋮ | ⋮ |
| Vϕ1 | Vϕ1 | Vϕ1 | Vϕ1 | Vϕ1 | Vϕ1 | Vϕ1 | Vϕ1 |
| Vϕ2 | Vϕ2 | Vϕ2 | Vϕ2 | Vϕ2 | Vϕ2 | Vϕ2 | Vϕ2 |
| Vϕ3 | Vϕ3 | Vϕ3 | Vϕ3 | Vϕ3 | Vϕ3 | Vϕ3 | Vϕ3 |
| Vϕ4 | Vϕ4 | Vϕ4 | Vϕ4 | Vϕ4 | Vϕ4 | Vϕ4 | Vϕ4 |
| Vϕ5 | Vϕ5 | Vϕ5 | Vϕ5 | Vϕ5 | Vϕ5 | Vϕ5 | Vϕ5 |
| Vϕ6 | Vϕ6 | Vϕ6 | Vϕ6 | Vϕ6 | Vϕ6 | Vϕ6 | Vϕ6 |
| Vϕ7 | Vϕ7 | Vϕ7 | Vϕ7 | Vϕ7 | Vϕ7 | Vϕ7 | Vϕ7 |
| VϕST | VϕST | VϕST | VϕST | VϕST | VϕST | VϕST | VϕST |
| VϕHLD | VϕHLD | VϕHLD | VϕHLD | VϕHLD | VϕHLD | VϕHLD | VϕHLD |
| ϕLV1 | ϕLV3 | ϕLV2 | ϕLV4 | ϕLV3 | ϕLV1 | ϕLV4 | ϕLV2 |
| ϕVOG1 | ϕVOG3 | ϕVOG2 | ϕVOG4 | ϕVOG3 | ϕVOG1 | ϕVOG4 | ϕVOG2 |
| ϕH1 || ϕH2 || ϕH1 || ϕH2 ||

FIG. 12

RELATED ART

| (1) | (3) | (2) | (4) | (3) | (1) | (4) | (2) |
|---|---|---|---|---|---|---|---|
| $V\phi 1$ | $V\phi 1$ | $V\phi 1$ | $V\phi 1$ | $V\phi 1$ | $V\phi 1$ | $V\phi 1$ | $V\phi 1$ |
| $V\phi 2$ | $V\phi 2$ | $V\phi 2$ | $V\phi 2$ | $V\phi 2$ | $V\phi 2$ | $V\phi 2$ | $V\phi 2$ |
| $V\phi 3$ | $V\phi 3$ | $V\phi 3$ | $V\phi 3$ | $V\phi 3$ | $V\phi 3$ | $V\phi 3$ | $V\phi 3$ |
| $V\phi 4$ | $V\phi 4$ | $V\phi 4$ | $V\phi 4$ | $V\phi 4$ | $V\phi 4$ | $V\phi 4$ | $V\phi 4$ |
| $V\phi 5$ | $V\phi 5$ | $V\phi 5$ | $V\phi 5$ | $V\phi 5$ | $V\phi 5$ | $V\phi 5$ | $V\phi 5$ |
| $V\phi 6$ | $V\phi 6$ | $V\phi 6$ | $V\phi 6$ | $V\phi 6$ | $V\phi 6$ | $V\phi 6$ | $V\phi 6$ |
| $V\phi 7$ | $V\phi 7$ | $V\phi 7$ | $V\phi 7$ | $V\phi 7$ | $V\phi 7$ | $V\phi 7$ | $V\phi 7$ |
| $V\phi 8$ | $V\phi ST$ | $V\phi 8$ | $V\phi ST$ | $V\phi ST$ | $V\phi 8$ | $V\phi ST$ | $V\phi 8$ |
| $V\phi 1$ | $V\phi HLD$ | $V\phi 1$ | $V\phi HLD$ | $V\phi HLD$ | $V\phi 1$ | $V\phi HLD$ | $V\phi 1$ |

| $\phi LV1$ | | $\phi LV2$ | | $\phi LV1$ | | $\phi LV2$ | |
|---|---|---|---|---|---|---|---|
| $\phi VOG1$ | | $\phi VOG2$ | | $\phi VOG1$ | | $\phi VOG2$ | |
| $\phi H1$ | | $\phi H2$ | | $\phi H1$ | | $\phi H2$ | |

SOLID-STATE IMAGE PICKUP APPARATUS WITH VERTICAL TRANSFER UNIT AND HORIZONTAL TRANSFER UNIT; AND CAMERA SYSTEM

BACKGROUND

The present disclosure relates to a solid-state image pickup apparatus and a camera system which perform a vertical transfer of signal charges in a plurality of horizontal blanking periods (hereinafter, also referred to as horizontal division periods) which are obtained by dividing a horizontal period in which a horizontal transfer is performed for signal charges of one line.

In related art, for a digital camera, a solid-state image pickup element is used which forms an image of light (incident light) from a subject on an image pickup surface and outputs an image pickup signal. A CCD imager used as such a solid-state image pickup element often uses a horizontal division transfer system in order to increase a frame rate of a moving image. As a drive method for a CCD image pickup element that uses the horizontal division transfer system, a technique disclosed in Japanese Patent Application Laid-open No. 2006-310655 is known.

Generally, in a frame reading mode of the horizontal division transfer system, in one horizontal blanking period (horizontal division transfer unit), out of a plurality of parts obtained by dividing one line, a vertical transfer of signal charges is performed with the use of a vertical register. Then, when the horizontal transfer of signal charges is performed with the use of a horizontal register from a vertical register on a last stage, the transfer is performed for each horizontal division transfer unit, and then image pickup signals of one line are output.

Here, with reference to FIGS. 12 to 14, a description will be given on an example of an electrode structure and an operation timing of a CCD image pickup element in related art. It should be noted that the structure of the CCD image pickup element in related art corresponding to FIG. 12 is disclosed in Japanese Patent Application Laid-open No. 2009-290890.

FIG. 12 is an explanatory diagram showing an arrangement example of electrodes of parts that perform the horizontal transfer from the vertical transfer in the case where a horizontal 4-division transfer for 8-field reading and a vertical division transfer system are used.

The CCD image pickup element in related art controls the transfer of signal charges to the horizontal register on electrodes of V$\phi$1 to V$\phi$8 (vertical transfer clock), V$\phi$ST (vertical storage control clock), V$\phi$HLD (vertical signal hold clock), $\phi$LV (vertical and horizontal shift clock), and $\phi$VOG (vertical register last stage control clock). As a result, in the horizontal register, it is possible to perform the horizontal transfer of the signal charges in multiple times. It should be noted that reference numerals (1) to (4) indicated in FIG. 12 correspond to order of columns in which the horizontal division transfer units output signal charges. Further, in the case where electrodes to which the clocks mentioned above are supplied from a timing signal generation unit (not shown) are represented, the reference numerals mentioned above are also used.

Here, columns (1) and (2) include V$\phi$1 to V$\phi$8 and V$\phi$1. V$\phi$1 on the last stage is an electrode used to make the transfer of signal charges to $\phi$LV1 or $\phi$LV2 easier. In columns not including V$\phi$ST like the columns (1) and (2), if only V$\phi$8 is disposed under V$\phi$7, a gate L length (transfer length) becomes longer, with the result that it may be impossible to desirably perform the transfer of the signal charges up to $\phi$LV1. In view of this, to the last stage of the vertical register, V$\phi$1 is added, and thus the gate L length per electrode is suppressed.

On the other hand, columns (3) and (4) include V$\phi$1 to V$\phi$7, V$\phi$ST, and V$\phi$HLD. Further, the columns (1) and (3) share $\phi$LV1 and $\phi$VOG1, and the columns (2) and (4) share $\phi$LV2 and $\phi$VOG2.

Next, the operation example of the CCD image pickup element in related art will be described.

First, signal charges accumulated in a photoelectric conversion unit are read to the vertical register in accordance with the vertical transfer clocks of V$\phi$1 to V$\phi$8. In the vertical register in the column (1), the signal charges are transferred to $\phi$LV1, and in the vertical register in the column (2), the signal charges are transferred to $\phi$LV2. On the other hand, in the vertical register in the columns (3) and (4), signal charges are accumulated in V$\phi$ST.

In the column (1), by controlling $\phi$VOG1, the signal charges of $\phi$LV1 are transferred to the horizontal register, and by controlling $\phi$H1 and $\phi$H2, the signal charges are output from the horizontal register.

In the column (2), by controlling $\phi$VOG2, the signal charges of $\phi$LV2 are transferred to the horizontal register, and by controlling $\phi$H1 and $\phi$H2, the signal charges are output from the horizontal register.

If the horizontal transfer of the signal charges is performed from the columns (1) and (2), transfer control of the signal charges in the columns (3) and (4) is performed.

In the column (3), the signal charges read from V$\phi$ST by controlling V$\phi$HLD are transferred to $\phi$LV1. Then, by controlling $\phi$VOG1, the signal charges of $\phi$LV1 are transferred to the horizontal register, and by controlling $\phi$H1 and $\phi$H2, the signal charges are output from the horizontal register.

In the column (4), the signal charges read from V$\phi$ST by controlling V$\phi$HLD are transferred to $\phi$LV2. Then, by controlling $\phi$VOG2, the signal charges of $\phi$LV2 are transferred to the horizontal register, and by controlling $\phi$H1 and $\phi$H2, the signal charges are output from the horizontal register.

Next, a description will be given on two types of drive methods for a frame reading mode with the use of the horizontal division transfer system.

FIG. 13 is a timing chart showing an example of an HD2 uniform drive.

A drive method for performing the horizontal transfer of the signal charges with a horizontal division period being equal (or uniform) is referred to as the "HD2 uniform drive". Here, an HD2 means a timing signal for defining a start of the horizontal division period. In performing the HD2 uniform drive, all the horizontal division periods are the same. Therefore, the length of a first horizontal division period in which the vertical transfer of signal charges of two packets is performed from a sensor unit is equal to the length of each of second to fourth horizontal division periods in each of which the horizontal transfer of signal charges is performed.

FIG. 14 is a timing chart showing an example of an HD2 reduction drive.

A drive method for performing the horizontal transfer of signal charges by reducing a horizontal division period in which the vertical transfer of signal charges read is not performed from the sensor unit is referred to as the "HD2 reduction drive". When the HD2 reduction drive is performed, only the first horizontal division period in which the vertical transfer of signal charges of two packets is performed from the sensor unit is long, and the second to fourth horizontal division periods in each of which the vertical transfer of signal charges is not performed are short. In this case, in accordance with whether the vertical transfer is performed or not, it is possible to optimize the horizontal division periods.

SUMMARY

Incidentally, in the HD2 uniform drive shown in FIG. 13, the length of each of the second to fourth horizontal division periods has to correspond to the length of the first horizontal division period, which is the longest. Therefore, it is necessary to provide an extra period which does not contribute to the transfer of signal charges, which results in lowering of a frame rate (length of each of the first to fourth horizontal division periods). On the other hand, if the HD2 reduction drive is performed, in the first horizontal division period, a blanking period only has to be secured by a period for the vertical transfer, and in the second to fourth horizontal division periods in which the vertical transfer of signal charges is not performed, a period for a transfer period to the horizontal register from the last stage of the vertical register only has to be secured. Thus, it is possible to reduce an entire horizontal blanking period, with the result that the frame rate can be increased.

However, depending on a specification of a signal processing circuit (for example, DSP (digital signal processor)) disposed on a rear stage of the CCD image pickup element, unless all the horizontal division transfer periods are the same, it may be impossible to process an image pickup signal. If such a signal processing circuit is used for a camera system, the CCD image pickup element is restricted to use not the HD2 reduction drive but the HD2 uniform drive. As described above, however, if the HD2 uniform drive is used, the frame rate may be lowered.

In view of the above-mentioned circumstances, it is desirable to efficiently perform a vertical transfer and a horizontal transfer of signal charges without lowering a frame rate even in a solid-state image pickup apparatus that outputs an image pickup signal by the HD2 uniform drive.

According to an embodiment of the present disclosure, there is provided a solid-state image pickup apparatus including a timing signal generation unit, a plurality of sensor units, a vertical transfer unit, a horizontal transfer unit, and a vertical and horizontal shift control unit. The timing signal generation unit is configured to generate a timing signal. The plurality of sensor units are arranged in a matrix pattern and configured to perform photoelectric conversion of light received on an image pickup surface to accumulate signal charges. The vertical transfer unit is provided for each vertical column of the sensor units and configured to transfer the signal charges read from the sensor units in a plurality of divided fields in a vertical direction in an image pickup area in a plurality of horizontal blanking periods obtained by dividing a horizontal period for a horizontal transfer of signal charges of one line on the basis of the timing signal. The horizontal transfer unit is configured to perform a horizontal transfer of the signal charges read from the sensor units to the vertical transfer unit along with the horizontal blanking periods on the basis of the timing signal and cause image pickup signals of one line to be output from an output unit. The vertical and horizontal shift control unit is configured to control a timing at which the vertical transfer unit transfers the signal charges to the horizontal transfer unit for each vertical column of the sensor units on the basis of the timing signal.

As a result, it is possible to perform the vertical and horizontal transfer of the signal charges without lowering the frame rate of the solid-state image pickup apparatus with the horizontal blanking periods divided being constant.

According to the present disclosure, it is possible to increase the frame rate of the solid-state image pickup apparatus with the horizontal blanking periods divided being constant. Further, it is possible to increase the versatility of the signal processing circuit disposed so as to be subsequent to the solid-state image pickup apparatus.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 9 is an explanatory diagram showing an example of an arrangement of electrodes including a vertical transfer unit and a horizontal transfer unit in the case where a horizontal 4-division transfer for 8-field reading and the vertical division transfer system are used according to the third embodiment of the present disclosure;

FIG. 12 is an explanatory diagram showing an arrangement example of electrodes of parts that perform a horizontal transfer from a vertical transfer in the case where a horizontal 4-division transfer for 8-field reading and a vertical division transfer system are used in related art;

DETAILED DESCRIPTION OF EMBODIMENTS

Hereinafter, modes for carrying out the present disclosure (hereinafter, referred to as embodiments) will be described. It should be noted that the description will be given in the following order.

1. First embodiment (Example of process for performing two vertical transfers in two horizontal division periods)
2. Second embodiment (Example of process for performing one vertical transfer in two horizontal division periods)
3. Third embodiment (Example of process for performing two vertical transfers in four horizontal division periods)
4. Application example 1. First Embodiment Example of Process for Performing Two Vertical Transfers in Two Horizontal Division Periods Hereinafter, a first embodiment of the present disclosure will be described with reference to FIGS. 1 to 6. In this embodiment, an example in which the present disclosure is applied to a solid-state image pickup apparatus 10 provided with a CCD image pickup element 1 will be described.

Figure 1:
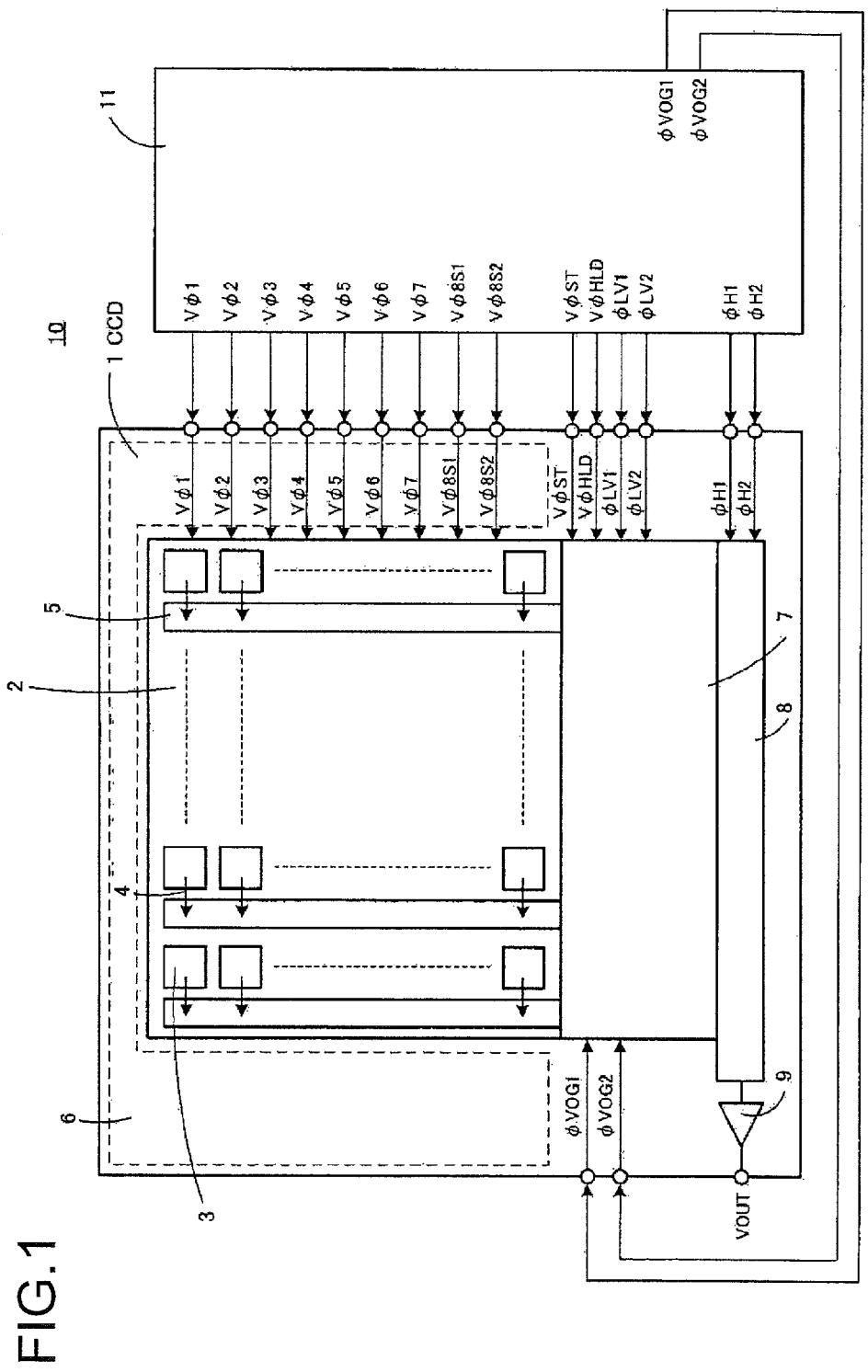
FIG. 1 is a schematic plan view showing an example of the entire structure of a solid-state image pickup apparatus according to a first embodiment of the present disclosure.

FIG. 1 is a schematic plan view showing an example of the entire structure of the solid-state image pickup apparatus 10. Here, as an example of a solid-state image pickup element, an example of the structure and an operation of the CCD image pickup element 1 that uses an 8-field reading system to transfer signal charges will be described.

The solid-state image pickup apparatus 10 is provided with the CCD image pickup element 1 and a timing signal generation unit 11 that generates a timing signal and supplies the timing signal to units of the CCD image pickup element 1.

The CCD image pickup element 1 is provided with an image pickup area 2 and a plurality of sensor units 3 that are arranged in a matrix pattern and perform photoelectric conversion for light received on an image pickup surface to accumulate signal charges and constitute pixels in the image pickup area 2. Around the image pickup area 2, an optical black area 6 is provided. Further, the CCD image pickup element 1 is provided with a read gate unit 4 that transfers the signal charges read from the sensor units 3 to a vertical register 5 provided for each vertical columns of the sensor units 3 and the vertical registers 5 that transfer the signal charges read by the read gate unit 4 in a vertical direction.

The vertical register 5 reads the signal charges from the sensor units 3 in a plurality of divided fields on the basis of the timing signal supplied from the timing signal generation unit 11. Further, the vertical register 5 is used as a vertical transfer unit that transfers the read signal charges in the vertical direction in the image pickup area 2 in a plurality of horizontal blanking periods obtained by dividing the horizontal period in which the horizontal transfer is performed for the signal charges of one line.

In addition, the CCD image pickup element 1 is provided with a vertical and horizontal shift control unit 7, a horizontal register 8 that transfers signal charges in a horizontal direction, and a charge voltage conversion unit 9 that converts the signal charges into voltage. Furthermore, the CCD image pickup element 1 is provided with an output unit (Vout) that outputs the signal charges that are converted into the voltage to a signal processing circuit (for example, DSP) (not shown) as an image pickup signal.

The vertical and horizontal shift control unit 7 controls a timing at which the vertical register 5 transfers the signal charges to the horizontal register 8 for each vertical column of the sensor units 3 on the basis of the timing signal from the timing signal generation unit 11. The vertical and horizontal shift control unit 7 is provided with a vertical storage control electrode (V$\phi$ST) that accumulates signal charges transferred from the vertical registers 5 every other column of the vertical registers 5. Further, the vertical and horizontal shift control unit 7 is provided with a vertical last stage control clock electrode ($\phi$VOG) that controls a timing at which signal charges transferred to a last stage of the vertical registers 5 are transferred to the horizontal register 8.

On the basis of the timing signal supplied from the timing signal generation unit 11, the horizontal register 8 performs the horizontal transfer for the signal charges read from the sensor units 3 to the vertical register 5 in the horizontal blanking period. The horizontal register 8 is used as a horizontal transfer unit that outputs an image pickup signal of one line from an output unit via the charge voltage conversion unit 9.

Next, the operation example of the solid-state image pickup apparatus 10 will be described.

The timing signal generation unit 11 applies vertical transfer clocks V$\phi$1 to V$\phi$7, V$\phi$8S1, and V$\phi$8S2 to the vertical registers 5. The V$\phi$1 to V$\phi$7, V$\phi$8S1, and V$\phi$8S2 in the vertical registers 5 each read the signal charges from the sensor units 3 for each of 8 fields. The signal charges read from the sensor units 3 to the vertical register 5 are transferred in the vertical direction for each of the 8 fields.

Further, the timing signal generation unit 11 applies vertical and horizontal shift clocks (V$\phi$ST, V$\phi$HLD, $\phi$LV1, and $\phi$LV2) to the vertical and horizontal shift control unit 7 and applies horizontal transfer clocks ($\phi$H1 and $\phi$H2) to the horizontal register 8. At this time, the vertical and horizontal shift control unit 7 transfers, to the horizontal register 8, the signal charges transferred from the vertical register 5 in a column in which the vertical storage control electrode is not provided. The signal charges transferred from the vertical register 5 in a column in which the vertical storage control electrode is provided are accumulated in the vertical storage control electrode and then transferred to the horizontal register 8.

Here, as described with reference to FIG. 12, in the vertical register 5 in the column (1), the signal charges are transferred to $\phi$LV1, and in the vertical register in the column (2), the signal charges are transferred to $\phi$LV2. On the other hand, in the vertical registers in the columns (3) and (4), the signal charges are accumulated in V$\phi$ST before the transfer.

In the columns (1) and (2), by controlling $\phi$VOG1 and $\phi$VOG2, the signal charges are transferred from $\phi$LV1 and $\phi$LV2 to the horizontal register 8, and by controlling $\phi$H1 and $\phi$H2, the signal charges are transferred from the horizontal register 8.

After that, in the columns (3) and (4), by controlling V$\phi$HLD, the signal charges are transferred from V$\phi$ST to $\phi$LV1 and $\phi$LV2. Further, by controlling $\phi$VOG1 and $\phi$VOG2, the signal charges are transferred from $\phi$LV1 and $\phi$LV2 to the horizontal register 8, and by controlling $\phi$H1 and $\phi$H2, the signal charges are subjected to the horizontal transfer from the horizontal register 8.

Furthermore, the signal charges that have been subjected to the horizontal transfer from the horizontal register 8 are subjected to voltage conversion by the charge voltage conversion unit 9 and are read as image pickup signals from the output unit (Vout) for each line.

Next, the operation example of the CCD image pickup element 1 will be described.

Figure 2:
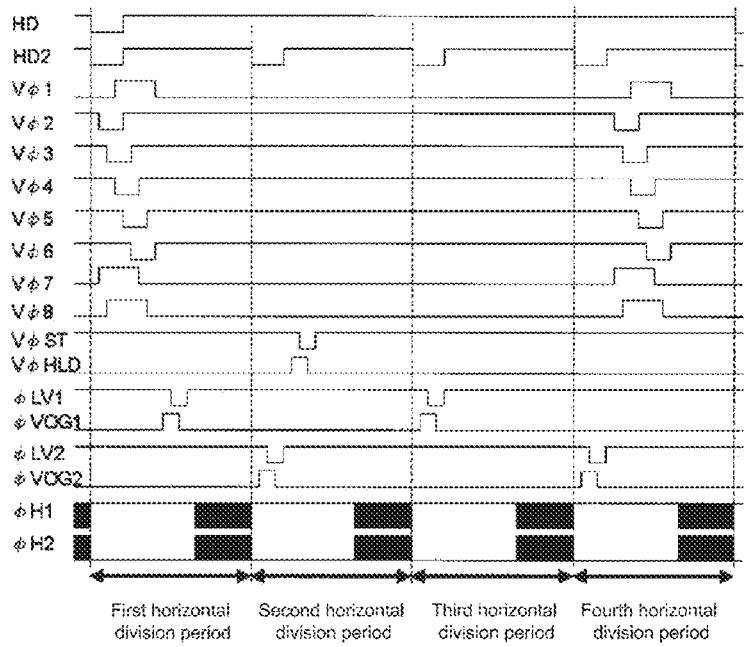
FIG. 2 is an explanatory diagram showing an example of a horizontal synchronization timing chart in a horizontal 4-division transfer frame reading mode according to the first embodiment of the present disclosure.

FIG. 2 is an explanatory diagram showing an example of a horizontal synchronization timing chart in a horizontal 4-division transfer frame reading mode. As described above, the CCD image pickup element 1 performs the horizontal 4-division transfer with the 8-field reading and the horizontal transfer of the signal charges with the vertical division transfer system.

First, in a first horizontal division period, HD and HD2 are each set to a low potential. After that, the low potential is applied to HD2 three times. At timings at which HD2 is set to the low potential, start timings of the first, a second, a third, and a fourth horizontal division periods are defined.

V$\phi$1 to V$\phi$8 as the vertical transfer clocks are set to high potentials in the first and fourth horizontal division periods, and signal charges read from the sensor unit 3 are transferred to the vertical register 5. V$\phi$8 shown in the timing chart indicates two electrodes V$\phi$8S1 and V$\phi$8S2 shown in FIG. 1. But in the horizontal synchronization, V$\phi$8S1 and V$\phi$8S2 are driven at the same timing and therefore abbreviated as V$\phi$8.

Here, the vertical transfer of signal charges of one line is performed with two packets. The vertical register 5 transfers the signal charges of one packet in the vertical direction in the first horizontal blanking period divided on the last stage in the horizontal period. The signal charges of one packet are transferred in the vertical direction in the second horizontal blanking period divided on the first stage in the horizontal period of the next line.

Specifically, the vertical transfer of the signal charges of initial one packet is performed in the fourth division period first, and then the vertical transfer of the signal charges of subsequent one packet is performed in the first division period.

If V$\phi$HLD as the vertical signal hold clock is set to a high potential in the second horizontal division period, V$\phi$ST as the vertical storage control clock is set to a low potential. At this timing, the signal charges in the column (3) are transferred from V$\phi$ST to $\phi$LV1, and the signal charges in the column (4) are transferred from V$\phi$ST to $\phi$LV2.

When $\phi$VOG1 as the vertical register last stage control clock is set to the high potential in the first horizontal division period, the signal charges in the column (1) are transferred from the last stage of the vertical register to the horizontal register 8. Further, when $\phi$VOG1 is set to the high potential in the third horizontal division period, the signal charges in the column (3) are transferred from the last stage of the vertical register to the horizontal register 8.

On the other hand, when $\phi$VOG2 is set to the high potential in the second horizontal division period, the signal charges in the column (2) are transferred from the last stage of the vertical register to the horizontal register 8. Further, when $\phi$VOG2 is set to the high potential in the fourth horizontal division period, the signal charges in the column (4) are transferred from the last stage of the vertical register to the horizontal register 8.

Then, by the horizontal transfer clocks $\phi$H1 and $\phi$H2, the horizontal transfer of the signal charges in the columns is performed for each of the first to fourth horizontal division periods.

Here, to compare to the CCD image pickup element 1 according to this embodiment, an operation example of a CCD image pickup element in related art will be described with reference to FIGS. 3 and 4.

Figure 3:
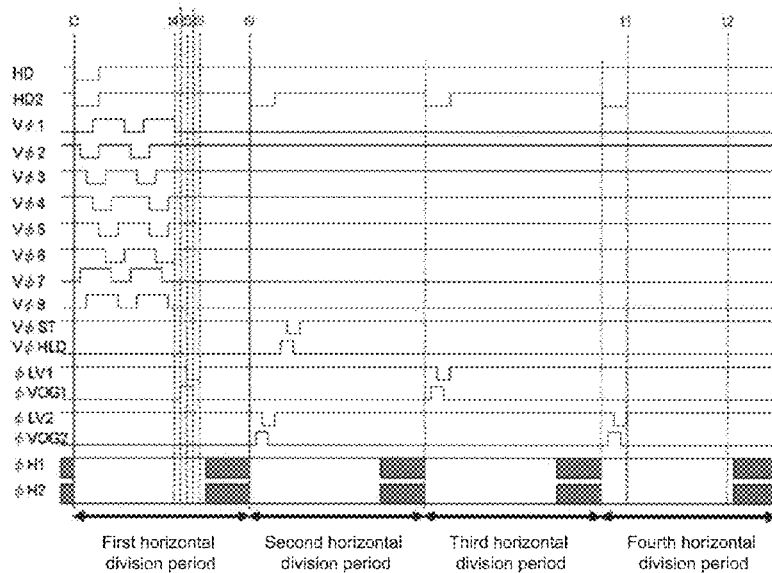
FIG. 3 is an explanatory diagram showing an example of a timing chart of a CCD image pickup element in related art.

FIG. 3 is an explanatory diagram showing an example of a timing chart of the CCD image pickup element in related art.

In the CCD image pickup element in related art, signal charges of two packets are read by V$\phi$1 to V$\phi$8 in a first horizontal division period. Here, a timing at which HD2 and $\phi$LV2 are each set to a high potential in a fourth horizontal division period is set as t1, and a timing at which HD and $\phi$LV2 are maintained to be the high potential is set as t2. Further, a timing at which the first horizontal division period is started, and HD and HD2 are each set to a low potential is set as t3.

Further, after the signal charges of two packets are read, a timing at which V$\phi$1 is set to the low potential, and V$\phi$6 is set to the high potential is set as t4, and a timing at which $\phi$VOG1 is set to the high potential is set as t5. Furthermore, a timing at which $\phi$LV1 is set to the low potential is set as t6, a timing at which $\phi$VOG1 is set to the low potential is set as t7, and a timing at which $\phi$LV1 is set to the high potential is set as t8. In addition, a timing at which the second horizontal division period is started, and HD2 is set to the low potential is set as t9.

Figure 4:
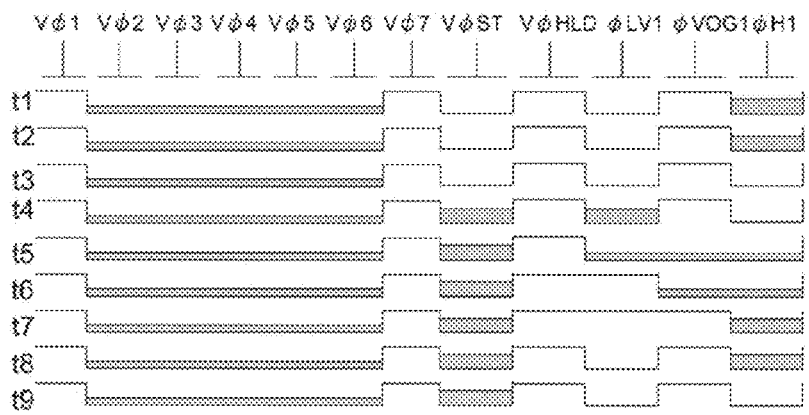
FIG. 4 is an explanatory diagram showing an example of a potential of the CCD image pickup element in related art.

FIG. 4 is an explanatory diagram showing an example of a potential of the CCD image pickup element in related art. The potential diagram of FIG. 4 shows the potential in the column (3) in the electrode arrangement diagram in related art shown in FIG. 12. In the column (3), V$\phi$ST is disposed next to V$\phi$7, so a potential of V$\phi$8 is not shown.

At the timings t1 to t8 shown in FIG. 3, potentials of electrodes to which the clocks of V$\phi$1 to V$\phi$8, V$\phi$ST, V$\phi$HLD, $\phi$LV1, $\phi$VOG1, and $\phi$H1 are applied are changed as follows.

At the timings t1 and t2, signal charges are accumulated in V$\phi$2 to V$\phi$6 and $\phi$H1 and are not accumulated in V$\phi$ST and $\phi$LV1.

At the timing t3, the signal charges are discharged from $\phi$H1 and are not accumulated in V$\phi$ST and $\phi$LV1.

At the timing t4, the signal charges are accumulated in V$\phi$ST and $\phi$LV1. It should be noted that in V$\phi$ST, the signal charges are accumulated at the timings t4 to t9.

At the timing t5, by setting $\phi$VOG1 to the high potential, the signal charges accumulated in $\phi$LV1 are flattened to $\phi$LV1, $\phi$VOG1, and $\phi$H1.

At the timing t6, by setting $\phi$LV1 to the low potential, the signal charges accumulated in $\phi$LV1 are moved to $\phi$VOG1 and $\phi$H1.

At the timing t7, by setting $\phi$VOG1 to the low potential, the signal charges accumulated in $\phi$VOG1 are moved to $\phi$H1.

At the timing t8, $\phi$LV1 is set to the high potential, and the signal charges are accumulated in $\phi$H1.

At the timing t9, the signal charges are discharged from $\phi$H1.

Next, the operation example of the CCD image pickup element 1 according to the first embodiment will be described with reference to FIGS. 5 and 6.

Figure 5:
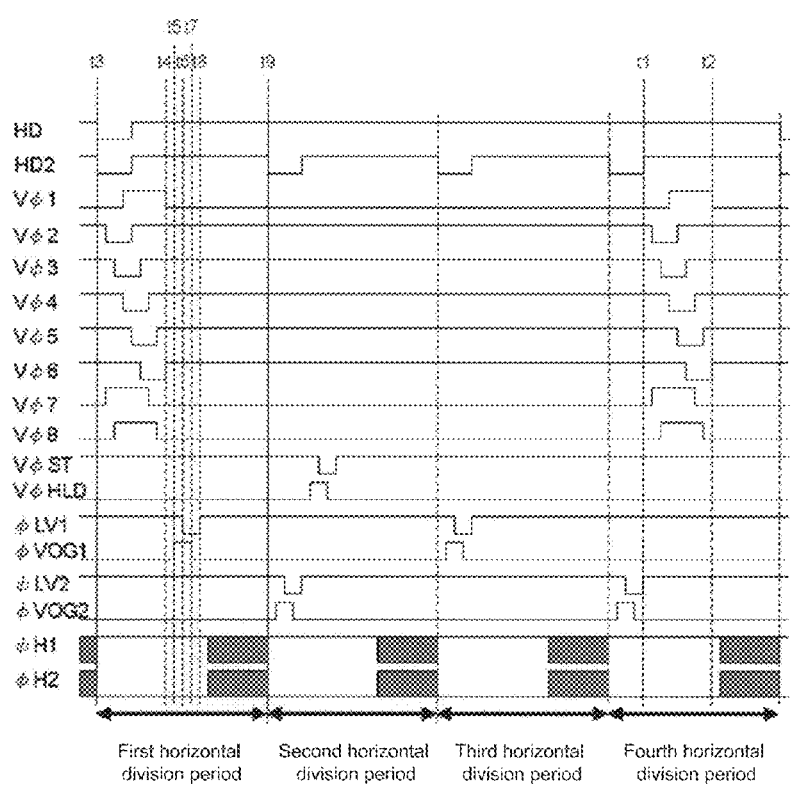
FIG. 5 is an explanatory diagram showing an example of a timing chart of the CCD image pickup element according to the first embodiment of the present disclosure.

FIG. 5 is an explanatory diagram showing an example of a timing chart of the CCD image pickup element 1.

In the CCD image pickup element 1 according to the first embodiment, V$\phi$1 to V$\phi$8 perform the first drive in the fourth horizontal division period and thereafter perform the second drive in the first horizontal division period. Here, a timing is set as t1 at which HD2 and $\phi$LV2 are set to the high potential in the fourth horizontal division period, and a timing is set as t2 at which V$\phi$1 is set to the low potential, and V$\phi$6 is set to the high potential after the vertical transfer of the signal charges of the first packet is performed in V$\phi$1 to V$\phi$8. A timing is set as t3 at which the first horizontal division period is started, and HD and HD2 are set to the low potential.

Further, a timing is set as t4 at which after V$\phi$1 to V$\phi$8 perform the vertical transfer of the signal charges of the second packet, V$\phi$1 is set to the low potential, and V$\phi$6 is set to the high potential, and a timing is set as t5 at which $\phi$VOG1 is set to the high potential. Furthermore, a timing is set as t6 at which $\phi$LV1 is set to the low potential, a timing is set as t7 at which φVOG1 is set to the low potential, and a timing is set as t8 at which φLV1 is set to the high potential. In addition, a timing is set as t9 at which the second horizontal division period is started, and HD2 is set to the low potential.

Figure 6:
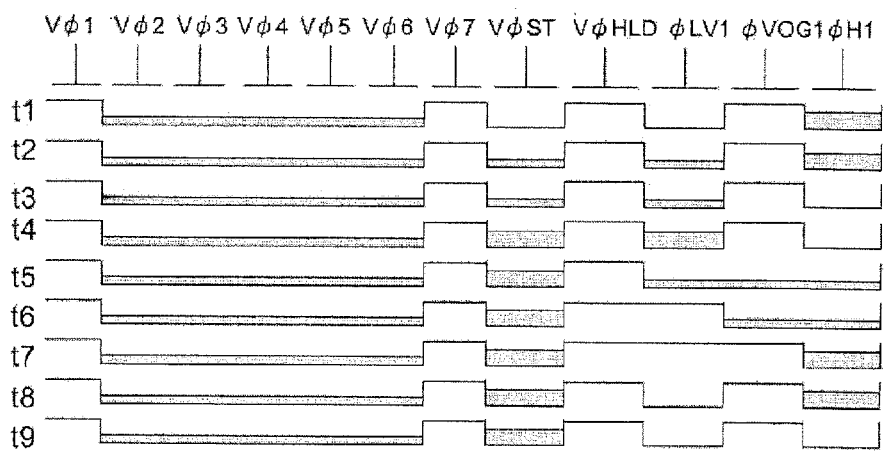
FIG. 6 is an explanatory diagram showing an example of a potential of the CCD image pickup element according to the first embodiment of the present disclosure.

FIG. 6 is an explanatory diagram showing an example of the potential of the CCD image pickup element 1.

At the timings t1 to t8 in FIG. 5, the potentials of electrodes to which the clocks of Vφ1 to Vφ8, VφST, VφHLD, φLV1, φVOG1, and φH1 are applied are changed as follows.

At the timing t1, signal charges are accumulated in Vφ2 to Vφ6 and φH1 and are not accumulated in VφST and φLV1.

At the timing t2, signal charges are accumulated in Vφ2 to Vφ6, VφST, φLV1, and φH1. In VφST, the signal charges are accumulated at the timings t2 to t9.

At the timings t3 and t4, the signal charges are discharged from the horizontal register 8 to which φH1 is added, and the signal charges are accumulated in VφST and φLV1.

At the timing t5, by setting φVOG1 to the high potential, the signal charges accumulated in φLV1 are flattened to φLV1, φVOG1, and φH1.

At the timing t6, by setting φLV1 to the low potential, the signal charges accumulated in φLV1 are moved to φVOG1 and φH1.

At the timing t7, by setting φVOG1 to the low potential, the signal charges accumulated in φVOG1 are moved to φH1.

At the timing t8, φLV1 is set to the high potential, and the signal charges are accumulated in φH1.

At the timing t9, all the signal charges are discharged from φH1.

The operation examples and potential examples of the CCD image pickup element in related art and the CCD image pickup element 1 according to the first embodiment are described above. The CCD image pickup element in related art and the CCD image pickup element 1 according to the first embodiment are different from each other in the operation in the period at the timings t1 to t4. The CCD image pickup element in related art performs the horizontal transfer in the fourth horizontal division period at the timings t1 to t3 and thereafter performs the vertical transfer of two packets of the next line at the timings t3 and t4. In contrast, the CCD image pickup element 1 performs the vertical transfer of the signal charges of one packet of the next line at the timings t1 and t2 and thereafter performs the horizontal transfer in the fourth horizontal division period at the timings t2 and t3. After that, the vertical transfer of the signal charges of the more one packet of the next line at the timings t3 and t4 is performed.

The potential relationship from the timing t5 to the next timing t1 in the CCD image pickup element 1 is not different from the CCD image pickup element in related art. However, by using the drive method according to the first embodiment, φLV and φVOG hold the signal charges when the vertical transfer of the signal charges of one packet of the next line is being performed in the fourth horizontal division period. Therefore, color mixing is not caused for the signal charges accumulated in the horizontal register 8 of the fourth horizontal division due to other signal charges.

By the solid-state image pickup apparatus 10 according to the first embodiment described above, the CCD image pickup element 1 is driven with the horizontal 4-division transfer for 8-field reading and the vertical division transfer system. Although the vertical transfer of two packets in the first horizontal division period in the drive in related art is performed, one of the packets is moved from the last stage of the vertical register 5 of the fourth horizontal division after the transfer by the horizontal register 8 is terminated.

Then, after the first vertical transfer of the signal charges in the fourth horizontal division period first, the second vertical transfer of the signal charges is performed in the first horizontal division period. As a result, it is possible to save the vertical transfer period of the first horizontal division period to be approximately half. This means that the first horizontal division period which is the longest in related art can be reduced. Further, the fourth horizontal division period in related art is corresponded to the first horizontal division period, so there is an extra period that does not contribute to the transfer. With the use of the period, even if the vertical transfer of the signal charges of one packet is performed, the blanking period is not extended. By performing the vertical transfer of the signal charges with the plurality of horizontal division periods divided being provided, the blanking period in each of the horizontal division periods can be shortened even if the timing of HD2 is uniform, and the frame rate can be increased.

It should be noted that the drive method of the CCD image pickup element 1 is applicable to other horizontal division transfer system such as horizontal 3 division transfer. In the drive method according to the first embodiment described above, the case of the vertical division transfer system disclosed in Japanese Patent Application Laid-open No. 2009-290890 is used for explanation, but the case other than the vertical division transfer system can be applied.

2. Second Embodiment

Example of Process for Performing One Vertical Transfer in Two Horizontal Division Periods With reference to FIG. 7, a description will be given on an example of another drive method of the solid-state image pickup apparatus 10 according to a second embodiment of the present disclosure. It should be noted that parts corresponding to FIG. 1 and the like described in the first embodiment are denoted by the same reference symbols, and a detailed description thereof will be omitted.

Figure 7:
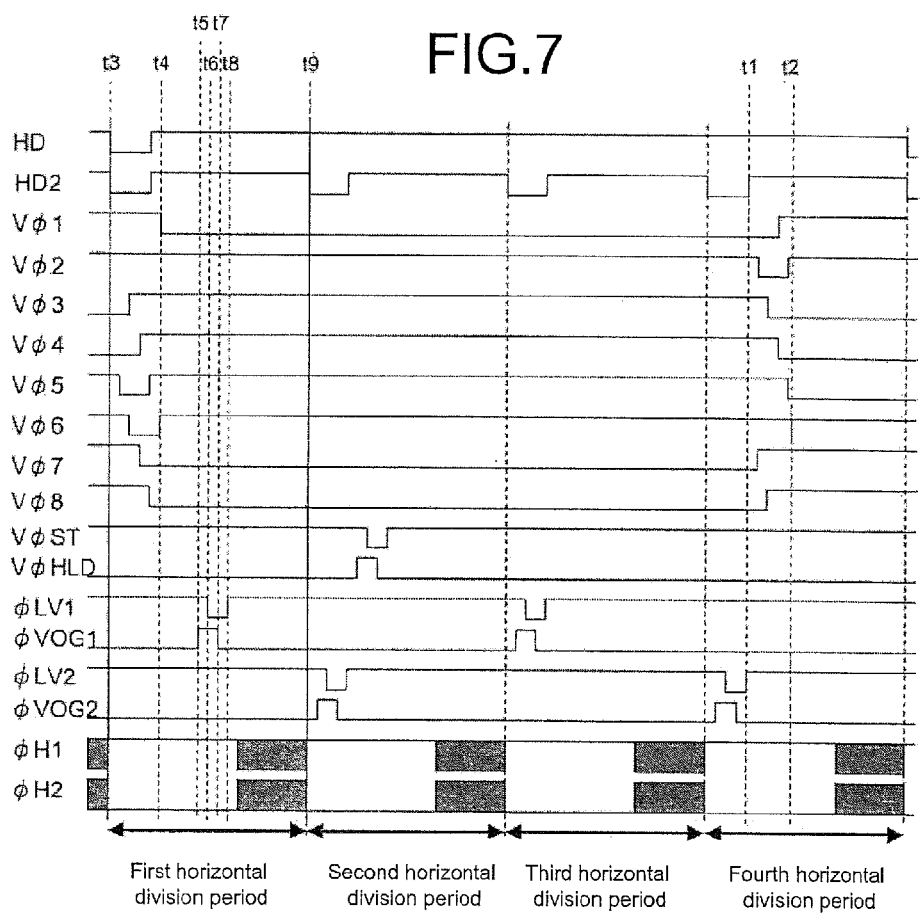
FIG. 7 is an explanatory diagram showing an example of a timing chart of the CCD image pickup element according to a second embodiment of the present disclosure.

FIG. 7 is an explanatory diagram showing an example of a timing chart of the CCD image pickup element 1 according to the second embodiment. In the CCD image pickup element 1 according to the second embodiment, the horizontal 4-division transfer for 8-field reading and the vertical division transfer system are also used.

In the CCD image pickup element 1 according to the second embodiment, first, in the fourth horizontal division period, a timing at which HD2 and φLV2 are set to a high potential is set as t1, and a timing at which Vφ2 is set to a high potential, and φT5 is set to the low potential is set as t2. Then, a timing at which the first horizontal division period is started, and HD and HD2 are set to the low potential is set as t3.

Further, a timing at which Vφ1 is set to the low potential, and Vφ6 is set to the high potential is set as t4, and a timing at which φVOG1 is set to the high potential is set as t5. Furthermore, a timing at which φLV1 is set to the low potential is set as t6, a timing at which φVOG1 is set to the low potential is set as t7, and a timing at which φLV1 is set to the high potential is set as t8. In addition, a timing at which the second horizontal division period is started, and HD2 is set to the low potential is set as t9.

A timing chart of the CCD image pickup element 1 according to the second embodiment from the timing t5 to the next timing t1 is the same as the timing chart of the CCD image pickup element 1 according to the first embodiment. However, the vertical register 5 transfers signal charges of one packet in the vertical direction in a plurality of continuous horizontal blanking periods divided. Therefore, at the timings t1 to t4, Vϕ1 to Vϕ8 transfer the signal charges of one packet over the fourth horizontal division period and the first horizontal division period.

In the solid-state image pickup apparatus 10 according to the second embodiment described above, the CCD image pickup element 1 performs the vertical transfer of the signal charges of one packet over the fourth horizontal division period to the first horizontal division period. In the case where the vertical transfer is divided as mentioned above, it is possible to shorten the horizontal division period necessary for the vertical transfers. Thus, it is also possible to shorten the horizontal division period in which the vertical transfer is not performed, with the result that it is possible to further increase the frame rate.

3. Third Embodiment

Example of Process for Performing Two Vertical Transfers in Four Horizontal Division Periods Next, with reference to FIGS. 8 to 10, a description will be given on a solid-state image pickup apparatus 20 according to a third embodiment of the present disclosure. It should be noted that parts corresponding to FIG. 1 and the like described in the first embodiment are denoted by the same reference symbols, and a detailed description thereof will be omitted.

In the solid-state image pickup apparatus 10 according to the second embodiment described above, the vertical transfer of the signal charges of one packet is performed in the two horizontal division periods of the fourth horizontal division period and the first horizontal division period. However, additional electrodes may be used. The solid-state image pickup apparatus 20 according to the third embodiment of the present disclosure has additional electrodes that contribute to the vertical transfer.

Figure 8:
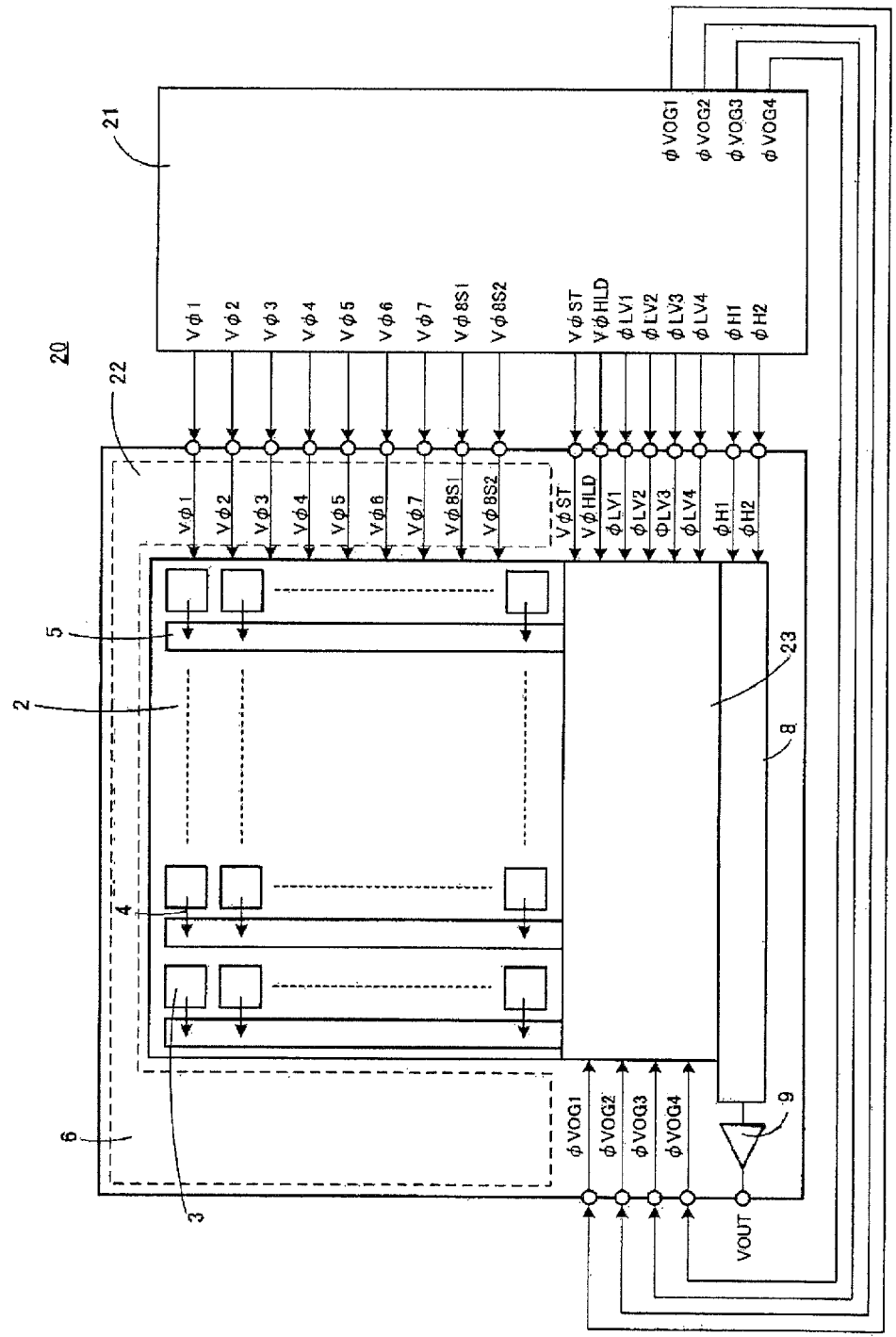
FIG. 8 is a schematic plan view showing an example of the entire structure of a solid-state image pickup apparatus according to a third embodiment of the present disclosure.

FIG. 8 is a schematic plan view showing an example of the entire structure of the solid-state image pickup apparatus 20. In a CCD image pickup element 22 according to the third embodiment, the horizontal 4-division transfer for 8-field reading and the vertical division transfer system are also used.

A timing signal generation unit 21 according to the third embodiment supplies, to the vertical registers 5 provided to the CCD image pickup element 22, clocks of Vϕ1 to Vϕ7, Vϕ8S1, and Vϕ8S2 and controls the vertical transfer of the vertical registers 5.

In addition, the timing signal generation unit 21 supplies clocks of VϕST, VϕHLD, ϕLV1 to ϕLV4, and ϕVOG1 to ϕVOG4 to a vertical and horizontal shift control unit 23. Then, the vertical and horizontal shift control unit 23 controls shift transfer for transferring signal charges from the vertical register 5 to the horizontal register 8.

Further, the timing signal generation unit 21 supplies the clocks of ϕH1 and ϕH2 to the horizontal register 8 and controls the horizontal transfer of the horizontal register 8.

In the solid-state image pickup apparatus 10 according to the first and second embodiments described above, as the electrode arrangement structure of the CCD image pickup element 1 that performs the general horizontal division drive system, the transfer timings of the signal charges are changed to increase the frame rate. On the other hand, in the solid-state image pickup apparatus 20 according to the third embodiment, by increasing the number of vertical control clock electrodes disposed in the CCD image pickup element 22, it is possible to finely divide timings for performing the vertical transfer along with the plurality of horizontal division transfer periods.

Subsequently, with reference to FIGS. 9 and 10, a description will be given on an example of the electrode structure of the CCD image pickup element 22 according to the third embodiment and the operation timing thereof.

FIG. 9 is an explanatory diagram showing an example of the arrangement of electrodes of parts that perform the horizontal transfer from the vertical transfer in the case where the horizontal 4-division transfer for 8-field reading and the vertical division transfer system are used. It should be noted that reference numerals (1) to (4) indicated in FIG. 9 correspond to order of columns in which the horizontal division transfer units output signal charges.

The vertical and horizontal shift control unit 7 is provided with a vertical storage control electrode (VϕST) that accumulates signal charges transferred from the vertical register 5 in all columns of vertical registers 5. Further, the vertical and horizontal shift control unit 7 is provided with a vertical last stage control clock electrode (ϕVOG) that controls a timing at which signal charges transferred to a last stage of the vertical register 5 are transferred to the horizontal register 8. Therefore, the electrode arrangement of the CCD image pickup element 22 according to the third embodiment is different from the electrode arrangement in related art shown in FIG. 12 in that VϕST and VϕHLD are provided to all the columns, and the control electrodes of ϕLV3, ϕVOG3, ϕLV4, and ϕVOG4 are additionally provided. Further, the signal charges transferred from the vertical register 5 are accumulated in the columns in the vertical storage control electrode and are then transferred to the horizontal register 8.

Figure 10:
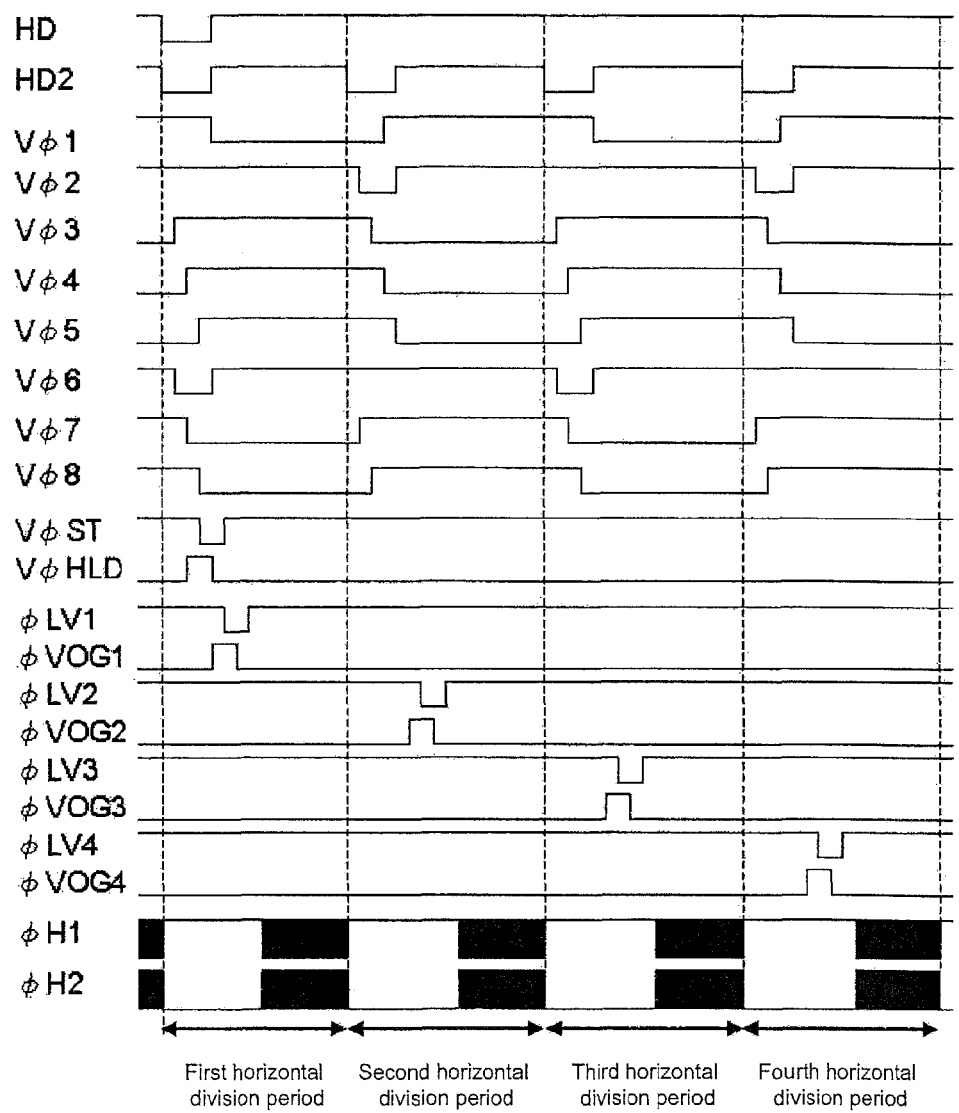
FIG. 10 is an explanatory diagram showing an example of a horizontal synchronization timing chart in a horizontal 4-division transfer frame reading mode according to the third embodiment of the present disclosure.

FIG. 10 is an explanatory diagram showing an example of a horizontal synchronization timing chart in a horizontal 4-division transfer frame reading mode. In the timing chart, Vϕ8S1 and Vϕ8S2 are abbreviated as Vϕ8.

For Vϕ1 to Vϕ8, signal charges read from the sensor unit 3 by performing switching between the high potential and the low potential for each of the first and second horizontal division periods and the third and fourth horizontal division periods are subjected to the vertical transfer from the vertical register 5 and accumulated in the VϕST. At this time, the vertical register 5 performs signal charges of one packet in the vertical direction in a plurality of continuous horizontal blanking periods divided. Then, the signal charges transferred from VϕST to ϕLV1 to ϕLV4 in the first horizontal division period are transferred to the horizontal register 8 in synchronization with a timing at which ϕVOG1 to ϕVOG4 are set to the high potential.

At this time, ϕLV1 and ϕVOG1 are driven in the first horizontal division period, ϕLV2 and ϕVOG2 are driven in the second horizontal division period, ϕLV3 and ϕVOG3 are driven in the third horizontal division period, and ϕLV4 and ϕVOG4 are driven in the fourth horizontal division period. As a result, ϕLV and ϕVOG provided in the columns transfer the signal charges to the horizontal register 8 along with the horizontal division periods. Then, the horizontal transfer clocks pH (ϕH1 and ϕH2) performs the horizontal transfer of the charges for each of the first to fourth horizontal division periods.

By the solid-state image pickup apparatus 20 according to the third embodiment described above, VϕST, VϕHLD are provided in all the columns. As a result, even if the vertical transfer of the signal charges read from the sensor unit 3 are divided into the horizontal division periods, color mixing due to different signal charges does not occur in the control electrodes of φLV1 to φLV4. Further, by accumulating the signal charges of one line in VφST of each column and dividing the control electrodes of φLV1 to φLV4 and φVOG1 to φVOG4 for each column, it is possible to transfer the signal charges from φLV1 to φLV4 to the horizontal register 8 for each horizontal division period.

As described above, the vertical transfer of two packets can be divided into the four horizontal division periods. Therefore, it is possible to shorten the blanking period of the horizontal division periods at the HD2 uniform timing and increase the frame rate of the solid-state image pickup apparatus 20. It should be noted that this can be applied to other horizontal division drive systems such as a horizontal 3 division structure, in addition to the case where the vertical transfer of the signal charges is divided into the 4 horizontal division periods.

In the solid-state image pickup apparatus according to the first to third embodiments described above, even in the case where the HD2 uniform drive is performed by limiting a signal processing circuit (DSP) on a rear stage in the CCD image pickup element 1 of the horizontal division transfer system, the frame rate of the frame reading mode can be increased. That is, it is possible achieve the speedup of the frame rate of the solid-state image pickup apparatus irrespective of a specification of a signal processing circuit provided to a camera system.

Further, by increasing the frame rate, it is possible to reduce noises such as a dark signal and a dark-time while line. Therefore, it is possible to improve the quality of images displayed on a display apparatus.

4. Application Example

Example in which Solid-State Image Pickup Apparatus is Applied to Camera System

The solid-state image pickup apparatus according to the above embodiments and various modified examples can be applied to a camera system such as a digital camera and a video camera, a cellular phone having an image taking function, or an electronic apparatus such as an apparatus equipped with an image taking function, for example. In this application example, as a structural example of an electronic apparatus, a camera system is used and described with reference to FIG. 11.

Figure 11:
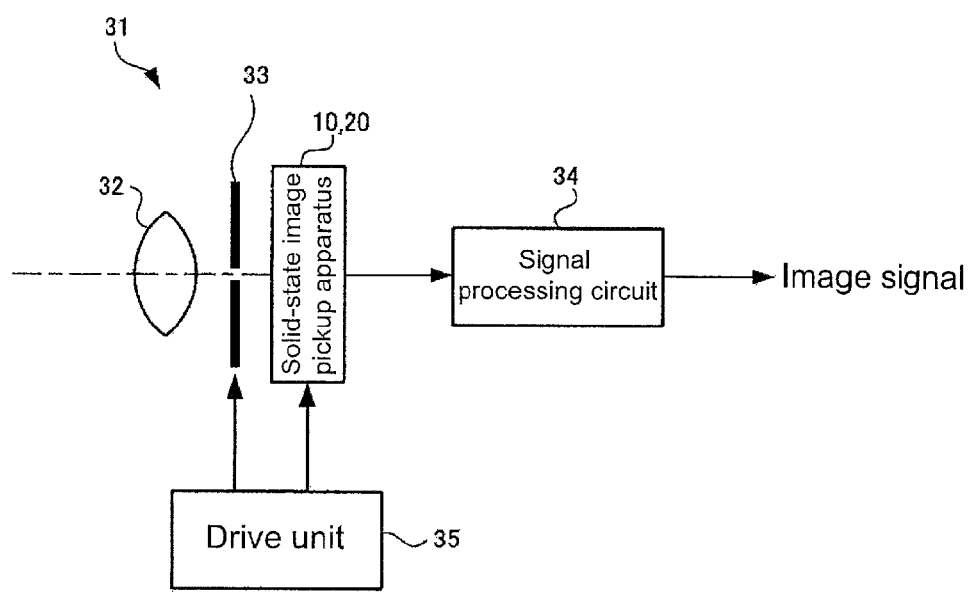
FIG. 11 is a block diagram showing an example of the internal structure of a video camera according to the first and second embodiments of the present disclosure.
Figure 13:
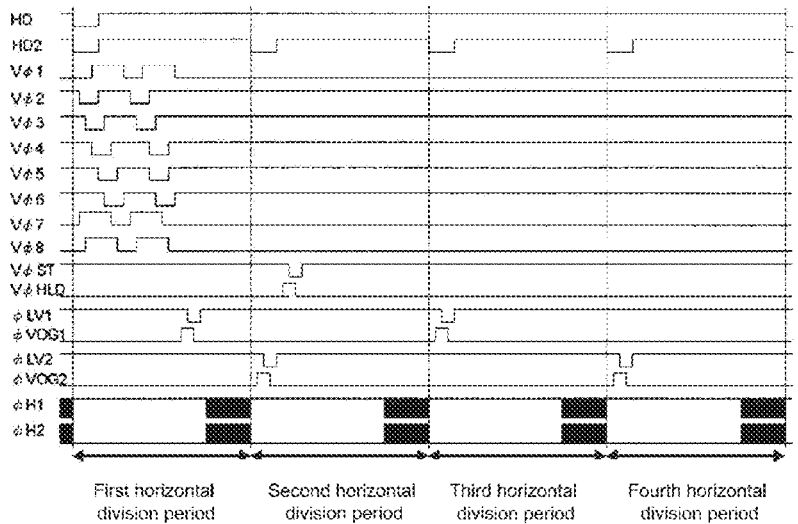
FIG. 13 is a timing chart showing an example of an HD2 uniform drive in related art.
Figure 14:
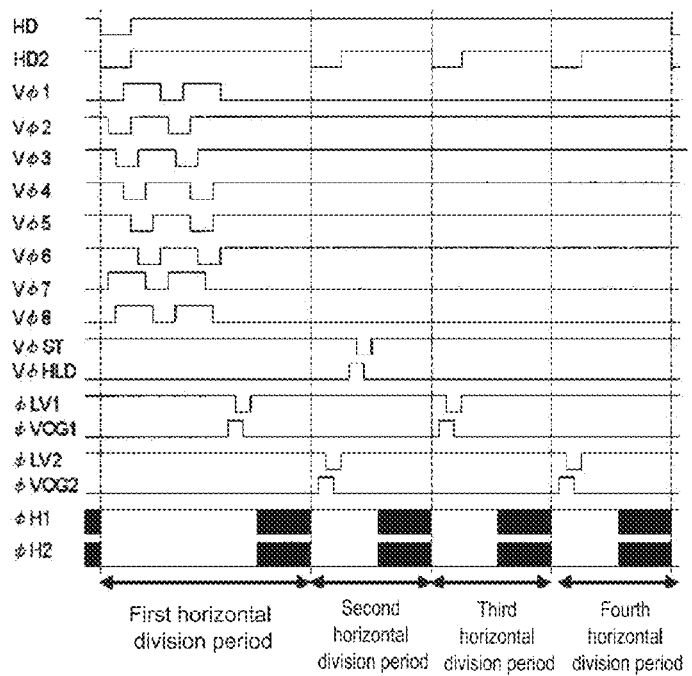
FIG. 14 is a timing chart showing an example of an HD2 reduction drive in related art.

FIG. 11 is a schematic structure of a camera system 31 according to an application example. It should be noted that the camera system 31 shown in FIG. 11 has a structural example of a video camera that can take still images or moving images, and the solid-state image pickup apparatus 10 according to the first or second embodiment is applied thereto. However, it is also possible to apply the solid-state image pickup apparatus 20 according to the third embodiment thereto.

The camera system 31 is provided with the solid-state image pickup apparatus 10, an optical system 32 provided with an optical lens that guides incident light to a light receiving sensor unit of the solid-state image pickup apparatus 10, a shutter 33 provided between the solid-state image pickup apparatus 10 and the optical system 32, and a drive unit 35 that drives the solid-state image pickup apparatus 10. Further, the camera system 31 is provided with a signal processing circuit 34 that processes an output signal of the solid-state image pickup apparatus 10.

The structures and functions of portions of the solid-state image pickup apparatus 10 are as follows.

The optical system 32 forms an image of light (incident light) from a subject on an image pickup surface (not shown) of the solid-state image pickup apparatus 10. As a result, signal charges are accumulated in the solid-state image pickup apparatus 10 for a constant period. It should be noted that the optical system 32 may be composed of an optical lens group including a plurality of optical lenses. Further, the shutter 33 controls a light irradiation period and a light shielding period of incident light with respect to the solid-state image pickup apparatus 10.

The drive unit 35 supplies a drive signal to the solid-state image pickup apparatus 10 and the shutter 33. By the drive signal supplied, the drive unit 35 controls a signal output operation of the solid-state image pickup apparatus 10 to the signal processing circuit 34 and a shutter operation of the shutter 33. That is, in this example, by the drive signal (timing signal) supplied from the drive unit 35, a signal transfer operation from the solid-state image pickup apparatus 10 to the signal processing circuit 34 is performed. At the time of the shutter operation, the drive unit 35 performs a process for controlling on and off of a transfer gate and a reset gate with respect to the solid-state image pickup apparatus 10 according to the first and second embodiments and the first modified example of the second embodiment described above.

The signal processing circuit 34 applies, to an image pickup signal output from the output unit of the solid-state image pickup apparatus 10, predetermined processes in synchronization with the horizontal blanking periods divided. The signal (image pickup signal) that has been subjected to various signal processes are stored in a storage medium (not shown) such as a memory or output to a monitor (not shown).

It should be noted that the present disclosure is not limited to the above embodiments and can of course have various other application examples and modified examples without departing from the gist of the present disclosure.

It should be noted that the present disclosure can take the following configurations.

(1) A solid-state image pickup apparatus, including:
a timing signal generation unit configured to generate a timing signal;
a plurality of sensor units arranged in a matrix pattern and configured to perform photoelectric conversion of light received on an image pickup surface to accumulate signal charges;
a vertical transfer unit provided for each vertical column of the sensor units and configured to transfer the signal charges read from the sensor units in a plurality of divided fields in a vertical direction in an image pickup area in a plurality of horizontal blanking periods obtained by dividing a horizontal period for a horizontal transfer of signal charges of one line on the basis of the timing signal;
a horizontal transfer unit configured to perform a horizontal transfer of the signal charges read from the sensor units to the vertical transfer unit along with the horizontal blanking periods on the basis of the timing signal and cause image pickup signals of one line to be output from an output unit; and
a vertical and horizontal shift control unit configured to control a timing at which the vertical transfer unit transfers the signal charges to the horizontal transfer unit for each vertical column of the sensor units on the basis of the timing signal.

(2) The solid-state image pickup apparatus according to Item (1), in which
the vertical and horizontal shift control unit includes
a vertical storage control electrode configured to accumulate the signal charges transferred from the vertical transfer unit every other column of the vertical transfer unit, and
a vertical last stage control clock electrode configured to control a timing at which the signal charges is transferred to a last stage of the vertical transfer unit to the horizontal transfer unit,
the vertical and horizontal shift control unit is configured to transfer to the horizontal transfer unit the signal charges transferred from the vertical transfer unit in a column without the vertical storage control electrode, and
the vertical and horizontal shift control unit is configured to accumulate in the vertical storage control electrode the signal charges transferred from the vertical transfer unit in a column where the vertical storage control electrode is provided and thereafter transfer the signal charges to the horizontal transfer unit.

(3) The solid-state image pickup apparatus according to Item (1) or (2), in which
the vertical transfer unit is configured to transfer in a vertical direction signal charges of one packet in a first horizontal blanking period divided on a last stage of the horizontal period and transfer in the vertical direction signal charges of one packet in a second horizontal blanking period divided on a first stage of a horizontal period of a next line.

(4) The solid-state image pickup apparatus according to any one of Items (1) to (3), in which
the vertical transfer unit is configured to transfer in a vertical direction signal charges of one packet in a plurality of continuous horizontal blanking periods divided.

(5) The solid-state image pickup apparatus according to Item (1), in which
the vertical and horizontal shift control unit includes
a vertical storage control electrode configured to accumulate the signal charges transferred from the vertical transfer unit in each of columns of the vertical transfer unit, and
a vertical last stage control clock electrode configured to control a timing at which the signal charges is transferred to a last stage of the vertical transfer unit to the horizontal transfer unit, and
the vertical and horizontal shift control unit is configured to accumulate the signal charges transferred from the vertical transfer unit in the vertical storage control electrode in each of the columns and thereafter transfer the signal charges to the horizontal transfer unit.

(6) The solid-state image pickup apparatus according to Item (1) or (5), in which
the vertical transfer unit is configured to transfer in a vertical direction signal charges of one packet in a plurality of continuous horizontal blanking periods divided.

(7) A camera system, including:
an optical system configured to form an image of light from a subject on an image pickup surface;
a solid-state image pickup apparatus including
a timing signal generation unit configured to generate a timing signal,
a plurality of sensor units arranged in a matrix pattern and configured to perform photoelectric conversion of light received on the image pickup surface to accumulate signal charges,
a vertical transfer unit provided for each vertical column of the sensor units and configured to transfer the signal charges read from the sensor units in a plurality of divided fields in a vertical direction in an image pickup area in a plurality of horizontal blanking periods obtained by dividing a horizontal period for a horizontal transfer of signal charges of one line on the basis of the timing signal,
a horizontal transfer unit configured to perform a horizontal transfer of the signal charges read from the sensor units to the vertical transfer unit along with the horizontal blanking periods on the basis of the timing signal and cause image pickup signals of one line to be output from an output unit, and
a vertical and horizontal shift control unit configured to control a timing at which the vertical transfer unit transfers the signal charges to the horizontal transfer unit for each vertical column of the sensor units on the basis of the timing signal; and
a signal processing circuit configured to apply a predetermined process to the image pickup signal output from the output unit in synchronization with the horizontal blanking periods.

The present disclosure contains subject matter related to that disclosed in Japanese Priority Patent Application JP 2012-048215 filed in the Japan Patent Office on Mar. 5, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pick-up apparatus comprising:
a vertical transfer unit configured to transfer a first packet of signal charges along a vertical pathway during a horizontal division period and transfer a second packet of the signal charges along the vertical pathway during a different horizontal division period, the horizontal division period is a time period that occurs before the different horizontal division period; and
a horizontal transfer unit configured to transfer the first packet of the signal charges along a horizontal pathway during the different horizontal division period and transfer the second packet of the signal charges along the horizontal pathway during a subsequent horizontal division period, the different horizontal division period is a time period that occurs before the subsequent horizontal division period.

2. The solid-state image pick-up apparatus according to claim 1, further comprising:
a vertical and horizontal shift control unit configured to transfer the first packet of the signal charges from the vertical pathway to the horizontal transfer unit during an intervening horizontal division period, the intervening horizontal division period is a time period that occurs between the horizontal division period and the different horizontal division period.

3. The solid-state image pick-up apparatus according to claim 2, wherein the vertical and horizontal shift control unit configured to transfer the first packet of the signal charges from the vertical pathway to the horizontal transfer unit during the subsequent horizontal division period.

4. The solid-state image pick-up apparatus according to claim 1, further comprising:
sensor units configured to convert light into the signal charges.

5. The solid-state image pick-up apparatus according to claim 4, further comprising:
- a read gate unit configured to transfer the first packet of the signal charges from the sensor units to the vertical transfer unit and transfer the second packet of the signal charges from the sensor units to the vertical transfer unit.

6. The solid-state image pick-up apparatus according to claim 1, further comprising:
- a charge voltage conversion unit configured to receive the first packet of the signal charges from the horizontal transfer unit and convert the first packet of the signal charges into a voltage.

7. The solid-state image pick-up apparatus according to claim 6, wherein the charge voltage conversion unit is configured to the second packet of the signal charges from the horizontal transfer unit and convert the second packet of the signal charges into another voltage.

8. The solid-state image pick-up apparatus according to claim 1, wherein the vertical transfer unit configured to transfer a third packet of the signal charges along the vertical pathway during the subsequent horizontal division period.

9. The solid-state image pick-up apparatus according to claim 1, wherein the vertical pathway extends along a vertical pathway direction and the horizontal pathway extends along a horizontal pathway direction, the horizontal pathway direction differs from the vertical pathway direction.

10. A camera system comprising:
- the solid-state image pick-up apparatus according to claim 1; and
- an optical system configured to form an image of light from a subject onto the solid-state image pick-up apparatus.

* * * * *